(12) United States Patent
Maeda et al.

(10) Patent No.: US 6,334,316 B1
(45) Date of Patent: Jan. 1, 2002

(54) DESICCANT ASSISTED AIR CONDITIONING SYSTEM

(75) Inventors: Kensaku Maeda, Tokyo; Yoshiro Fukasaku, Fujisawa; Hideo Inaba, Okayama; Toshiaki Oouchi, Okayama; Rosuke Nishida, Okayama, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/581,819

(22) PCT Filed: Mar. 15, 1999

(86) PCT No.: PCT/JP99/01246

§ 371 Date: Jun. 19, 2000

§ 102(e) Date: Jun. 19, 2000

(87) PCT Pub. No.: WO99/47866

PCT Pub. Date: Sep. 23, 1999

(30) Foreign Application Priority Data

Mar. 17, 1998 (JP) ............................................ 10-088162

(51) Int. Cl.[7] ............................................. F25D 17/06
(52) U.S. Cl. ................................ 62/94; 62/69.7; 62/271
(58) Field of Search ...................... 62/94, 271; 252/69.7

(56) References Cited

U.S. PATENT DOCUMENTS

| 3,844,737 A | 10/1974 | Marciss et al. | |
| 4,887,438 A | 12/1989 | Meckler | 62/271 |
| 5,052,188 A | 10/1991 | Komarneni et al. | 62/94 |
| 5,297,398 A | 3/1994 | Meckler | |
| 5,325,676 A | 7/1994 | Meckler | 62/93 |
| 5,364,455 A | 11/1994 | Komarneni et al. | 95/117 |
| 5,419,145 A * | 5/1995 | Chandler et al. | 62/112 |
| 5,448,895 A | 9/1995 | Coellner et al. | 62/94 |
| 5,471,852 A * | 12/1995 | Meckler | 62/271 |
| 5,562,427 A * | 10/1996 | Mangyo et al. | 417/313 |
| 5,660,048 A * | 8/1997 | Belding et al. | 62/94 |
| 5,761,923 A | 6/1998 | Maeda | 62/271 |
| 5,816,065 A | 10/1998 | Maeda | 62/271 |
| 5,860,284 A * | 1/1999 | Goland et al. | 62/94 |
| 6,003,327 A * | 12/1999 | Belding et al. | 62/271 |
| 6,018,953 A * | 2/2000 | Belding et al. | 62/94 |
| 6,050,100 A * | 4/2000 | Belding et al. | 62/271 |

* cited by examiner

Primary Examiner—Henry Bennett
Assistant Examiner—Mark Shulman
(74) Attorney, Agent, or Firm—Armstrong, Westerman, Hattori, McLeland & Naughton, LLP

(57) ABSTRACT

A compact and energy efficient air conditioning system is operated with a desiccant material having a high differential adsorption capacity even at lower regeneration temperatures than those in the conventional system. The desiccant assisted air conditioning system comprises a process air path (A) for flowing process air to adsorb moisture from the process air by a desiccant member, and a regeneration air path (B) for flowing regeneration air heated by a heat source to desorb moisture from the desiccant member (103). The desiccant member is arranged so that the process air or the regeneration air flows alternatingly through the desiccant member. The desiccant member is arranged so that the process air or the regeneration air flows alternatingly through the desiccant member. The desiccant member comprises an organic polymer material, the organic polymer material comprising an amphoteric ion exchange polymer having an anion exchange group, a cation exchange group and bridging ligands, thereby exhibiting a high differential adsorption capacity.

10 Claims, 14 Drawing Sheets

F I G. 1
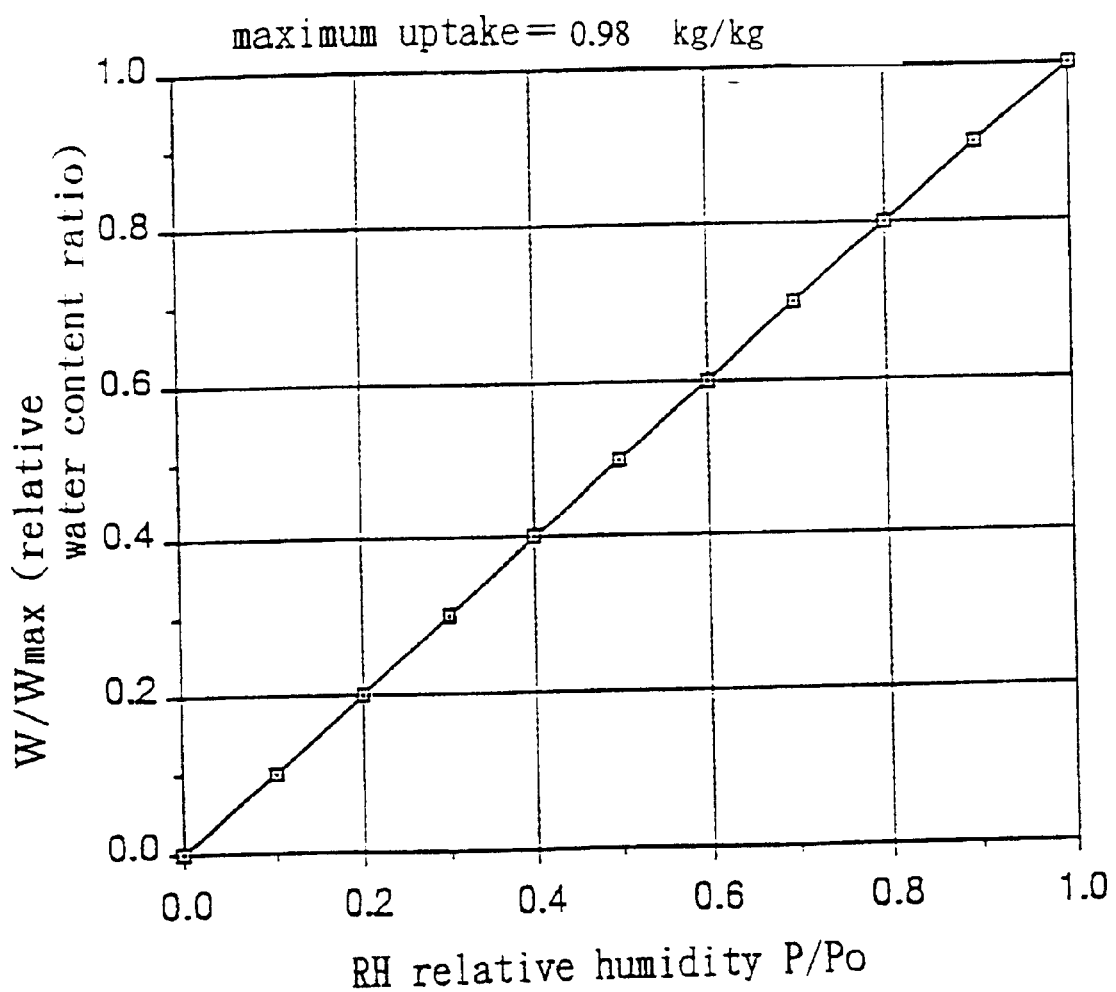

DESICCANT ASSISTED AIR CONDITIONING SYSTEM

TECHNICAL FIELD

The present invention relates in general to dehumidifying air conditioning systems, and relates in particular to a desiccant assisted air conditioning system to provide continuous processes of desiccant-assisted dehumidification and desiccant-regeneration using a heat source.

BACKGROUND ART

FIG. 10 shows a conventional dehumidifying air conditioning system having a process air path for dehumidifying air by passing the air through a desiccant, and a regeneration air path for desorbing moisture from the desiccant by passing heated air through the desiccant, arranged in such a way to flow the process air and regeneration air alternatingly through the desiccant. The system comprises: a process air path A; a regeneration air path B; a desiccant wheel 103; two sensible heat exchangers 104, 121; a heater 220; and a humidifier 105. Process air is dehumidified in the desiccant wheel 103, and, in this process, is heated by the heat of adsorption of moisture in the desiccant member, and is cooled next by passing through a first heat exchanger 104 by exchanging heat with the regeneration air. Process air is further cooled in the humidifier 105 before being supplied to the conditioning space (room) supply air SA. In the meantime, outside air (OA) serving as regeneration air is admitted into the first sensible heat exchanger 104 which raises the temperature of regeneration air by transferring heat from the dehumidified process air, and the heated regeneration air is further heated by a heat source 200 in the heating device 220 to lower its relative humidity, and is passed through the desiccant wheel 103 to desorb the moisture from the desiccant member. In the conventional system, sensible heat portion in the post-regeneration regeneration air is recovered by heat exchange with unheated regeneration air in the second sensible heat exchanger 121, before exhausting the regeneration air to outside (EX). This type of system is known as a desiccant-assisted air conditioning system, and is an important practical technique to provide control over conditioning space humidity.

Desiccant materials which can be used in such desiccant-assisted air conditioning systems are known to include silica-gel and zeolite (known as molecular sieve), which are classified as a modified zeolite in Breuner type 1. It is said that those materials having an isothermal separation factor in the range of 0.07~0.5 are most suitable as a desiccant member which is used in those systems designed to carry out desiccant regeneration by using some combustible gas as heat source. U.S. Pat. No. 3,844,737 mentions zeolite as a desiccant material in air conditioning systems using combustible gases for heating regeneration air, but, no prior publications give any suggestions regarding the suitable adsorption characteristics of zeolite. Although lithium chloride has also been used as a moisture adsorbing material, its use has gradually been discontinued because of deliquescence tendency when exposed to high humidity to fall out from a rotating frame of the desiccant wheel.

In air conditioning technologies based on combustible gas heating of regeneration air, as mentioned above, regeneration temperature is reported as 101° C. (215° F.) or 143° C. (290° F.). It is said that zeolite is suitable for regeneration at such temperatures, and in particular, zeolite having an isothermal separation factor R between 0.07~0.5 as exemplified by R=0.1 in FIG. 11 is most suitable. However, if other types of heating sources are considered for desiccant regeneration, lower regeneration temperatures (65~75° C.) offer more available choices, such as waste heat and solar heating. But, in such a case, zeolite materials in Breuner type 1 class and having a separation factor in the range of 0.07~0.5 are not always an optimum material for desiccant. The reason will be explained with reference to FIG. 11.

FIG. 11 is an adsorption isotherm of conventional zeolite. When outdoor air is used as regeneration air in a desiccant-assisted air conditioning system, humidity ratio in summer is estimated to be about 20~21 g/kg (g moisture/kg air) for design purposes. When such an air is heated to a desiccant desorption temperature of 110° C. mentioned above, its relative humidity drops to about 3.0%. On the other hand, relative humidity of process air to be dehumidified can be estimated to be about 50% based on general room conditions where dry-bulb temperature is 27° C. and wet-bulb temperature is 19° C. as specified in JIS(Japanese Industrial Standard)-C9612, for example. The desiccant member thus alternatingly contacts process air and regeneration air, respectively, at 50% and 3% relative humidity. Equilibrium moisture content in zeolite in contact with regeneration air at 3% relative humidity is found to be X=0.236 from FIG. 11, using a functional relation $X=P/(R+P-R\times P)$ for a separation factor R=0.1 and P=0.030.

On the other hand, equilibrium moisture content in zeolite in contact with process air exhausted from a room can be found, similarly, to be X=0.910 for separation factor R=0.1 and P=0.5. Therefore, in the case of heating the regeneration air to 101° C. for desorbing zeolite, the amount of moisture which can be adsorbed by the desiccant member is 0.169 kg/kg, which is obtained by multiplying the difference in the relative adsorbed amount (0.910−0.236=0.674) with the maximum uptake 0.25 kg/kg (kg water per kg zeolite). If a material such as silica-gel is used, whose characteristic adsorption isotherm is linear (isothermal separation factor R=1), the difference in desorption and adsorption is the same as the difference in the relative humidity values, 0.500−0.030=0.470, and a corresponding value drops to 0.140 kg/kg, which is obtained by multiplying the maximum uptake (usually 0.3 kg/kg for silica-gel) with 0.470. Therefore, zeolite is more effective in this case. This example shows that, when the desorption temperature is as high as 101° C. as in the conventional air conditioning apparatus, the use of zeolite is clearly more advantageous. However, when similar calculations are performed for the range of desorption temperatures of 50~70° C. as desired in the present invention, superiority of zeolite is not certain and the differential adsorption capacity (difference in desorbed/adsorbed amount) is significantly decreased. This will be explained in more detail below with reference to FIG. 12.

FIG. 12 shows the configuration of a desiccant-assisted air conditioning system disclosed the inventor, comprised by a process air path for dehumidifying and a regeneration air path for flowing air which is first heated in a heating source before desorbing moisture from the moisture-laden desiccant member 103, arranged in such a way that regeneration air and process air alternatingly flow through the desiccant member 103. Dehumidified process air is cooled in a low-temperature heat source 240 of a heat pump, and pre-desiccant regeneration air is heated in a high-temperature heat source 220 of the heat pump. FIG. 13 shows a psychrometric chart to show the operation of the system shown in FIG. 12.

Accordingly, by cooling the dehumidified process air in the low-temperature source 240 of the heat pump, the temperature of supply air SA (state N) can be lowered below that of the room (state K) as shown in FIG. 13. Therefore the humidifier 105 used in the conventional system shown in FIG. 10 becomes unnecessary so that dehumidified cooled process air and supply air SA have the same humidity ratio, thus providing a higher cooling effect than the conventional system. Those skilled in the art know that, for summer air conditioning, supply air is generally at less than 8 g/kg (moisture per kg of air), therefore, by setting the humidity ratio of the supply air, i.e., dehumidified process air at 7 g/kg, the process air changes its state from the room state along an isenthalpic line until it reaches 7 g/kg where a relative humidity is 20%, as shown in FIG. 13 (when the adsorption heat is high as in zeolite, relative humidity of 20% is reached at a slightly higher humidity ratio value of 8 g/kg).

It is known by those skilled in the art that the relative humidity of dehumidified process air is equal to the relative humidity of regeneration air before regeneration (for example, refer to reference material p23~25 of TC 3.5/short course seminar, US ASHRAE Society Annual Meeting, 1997). Therefore, outdoor air can be heated to a temperature to lower its relative humidity so as to be used as regeneration air to regenerate the desiccant member.

In other words, humidity ratio in summer is generally about 15 g/kg, therefore, such an air, when heated to 50° C. having a 20% relative humidity, can be used as regeneration air. Humidity ratio can reach a value of 20 g/kg on rare occasions, but even such an air can be heated to 55° C. and used for dehumidifying the process air to less than 8 g/kg moisture. Therefore, it is desirable for such an air conditioning system to have a desiccant material which provides a high moisture removal capacity at regeneration temperature of 50~70° C., but the conventional zeolite shows a low capacity for moisture content difference between its absorption and desorption state. Thus, low capacity must be compensated by increasing the mass of the desiccant. This will be explained in more detail below.

When the regeneration air at humidity ratio of 15 g/kg is heated to 50° C., its relative humidity is about 20% (18.9% accurately). Therefore, equilibrium moisture content of zeolite of separation factor R=0.1 in contact with regeneration air is X=0.71 for P=0.2 when relative humidity is 20% as shown in the graph in FIG. 11. On the other hand, equilibrium moisture content of zeolite in contact with spent process air exhausted from the room is X=0.91 at P=0.5 as before. Therefore, by flowing regeneration air heated to 50° C., the desiccant can adsorb moisture of 0.05 kg/kg, obtained by multiplying the differential adsorption capacity 0.20 (=0.91–0.71) with the maximum uptake of 0.25 kg/kg for zeolite. Comparing this value 0.05 with the previous value 0.169 kg/kg, gives a ratio as 1/3.4, which means that the size of the zeolite desiccant needs to be 3.4 times larger.

FIG. 14 is a graph, calculated from the adsorption isotherm of FIG. 11, showing the relationship between adsorption capacity of zeolite and temperature of air in contact therewith for various parametric values of the humidity ratio of the air. Point A is the adsorption-start point where the moisture content of zeolite is in equilibrium with process air, and points D50 and D70 are the desorption- or regeneration-start points where the moisture content of zeolite is in equilibrium with regeneration air at 50 and 70° C., respectively. This graph also shows that the differential adsorption capacity is 0.05 and 0.11 kg/kg, respectively, for 50° C.-regeneration and 70° C.-regeneration. These values confirm that the desiccant size must be increased by 1.5~3.4 times the size of a desiccant regenerated at higher temperatures.

On the other hand, if a material such as silica-gel is used, whose adsorption isotherm is linear (separation factor R=1), the differential adsorption capacity is 0.3 (=0.5–0.2) for 50° C.-regeneration (relative humidity 20%), similarly to the differential relative humidity, so that, adsorbed amount is 0.09 kg/kg, obtained by multiplying 0.3 with the maximum uptake of 0.3 kg/kg for silica-gel. For 70° C.-regeneration (relative humidity 7.5%), the adsorbed amount is 0.127 kg/kg, obtained by multiplying the differential adsorption capacity 0.425 (=0.5–0.075) with the maximum uptake of 0.3 kg/kg for silica-gel. These values (0.09, 0.127) are higher than those for zeolite type 1 (0.05, 0.11), but even in these cases, it is clear that the desiccant size must be increased compared with the high-temperature regeneration process which produces an adsorption amount of 0.14 kg/kg.

It can be seen, therefore, that the conventional desiccant technology is not adaptable to low-temperature regeneration (50~70° C.), and the necessity for a larger desiccant leads to a large air conditioning system and high operating cost.

DISCLOSURE OF INVENTION

It is an object of the present invention to provide a compact and energy efficient air conditioning system that is operated with a desiccant material having a high differential adsorption capacity even at lower regeneration temperatures than those in the conventional system.

A desiccant assisted air conditioning system comprises: a process air path for flowing process air to adsorb moisture from the process air by a desiccant member; and a regeneration air path for flowing regeneration air heated by a heat source to desorb moisture from the desiccant member, the desiccant member being arranged so that the process air or the regeneration air flows alternatingly through the desiccant member; wherein the desiccant member comprises an organic polymer material, the organic polymer material comprising an amphoteric ion exchange polymer having an anion exchange group, a cation exchange group and bridging ligands, thereby exhibiting a high differential adsorption capacity.

An air conditioning system using such a desiccant material permitting regeneration at relatively low temperatures (50~70° C.) enables to provide a compact and energy efficient air conditioning system.

The organic polymer material is obtained by reacting an acrylonitrile homopolymer or copolymer with a hydrazine or hydrazine homologue to provide an anion exchange group followed by hydrolyzing residual nitrile group to provide a cation exchange group.

The organic polymer material thus produced can be used as a desiccant material in the air conditioning system that is energy conserving and compact because the desiccant medium can be regenerated at 50~70° C.

The organic polymer material may include the anion exchange group at a concentration of 0.01~5.0 meq/g and the cation exchange group at a concentration of 2~11 meq/g.

The desiccant medium having the properties so defined exhibits a high deferential moisture adsorption capacity, to enable a compact high energy efficiency system.

The desiccant material may be regenerated at a temperature of not more than 70° C.

Because the desiccant medium allows regeneration at low temperatures, heat pump can be operated at relatively low temperatures, thereby enabling to provide a compact and high efficiency air conditioning system.

Dehumidified process air is cooled by a low-temperature heat source of a heat pump, and pre-desiccant regeneration air is heated with a high-temperature source of the heat pump.

Accordingly, regeneration air is heated by recycling the heat recovered from dehumidified process air, thereby enabling to maximize utilization of output heat from the heat pump, and also enabling to decrease the temperature lift required for the heat pump, thereby providing a compact and energy efficient air conditioning system.

BRIEF DESCRIPTION OF DRAWINGS

FIG. 1 is a graph of adsorption isotherm of the high adsorption polymeric material used as a desiccant in a first embodiment of the humidity-controlled air conditioning system of the present invention;

BEST MODE FOR CARRYING OUT THE INVENTION

Preferred embodiments will be presented in the following with reference to the drawings.

Preferred embodiments will be explained in the following.

A first embodiment of the humidity-controlled air conditioning system (such as the one shown in FIG. 12) uses a high adsorption capacity desiccant material, made from a high polymer material which is an amphoteric ion exchange polymer having both anion exchange group and cation exchange group, and bridging legands, produced by reacting an acrylonitrile homopolymer or copolymer with a hydrazine or hydrazine homologue to provide the anion exchange group and then hydrolyzing the residual nitrile group to provide the cation exchange group. The desiccant material thus produced contains 0.01~5.0 meq/g of the anion exchange group and 2~11 meq/g of the cation exchange group. This material was pulverized and the adsorption characteristics of the powdered material were examined as follows:

FIG. 1 shows a graph of measured adsorption isotherm data of this high adsorption polymer, in terms of relative humidity on the horizontal axis and relative adsorption on the vertical axis defined by a ratio of the measured absorption W to adsorption $W_0$ at 100% desiccant humidity (maximum uptake). The separation factor R for this material is linear (R=1.0) as in silica-gel, but its maximum uptake value 0.98 kg/kg is larger than that for silica-gel.

Figure 2:
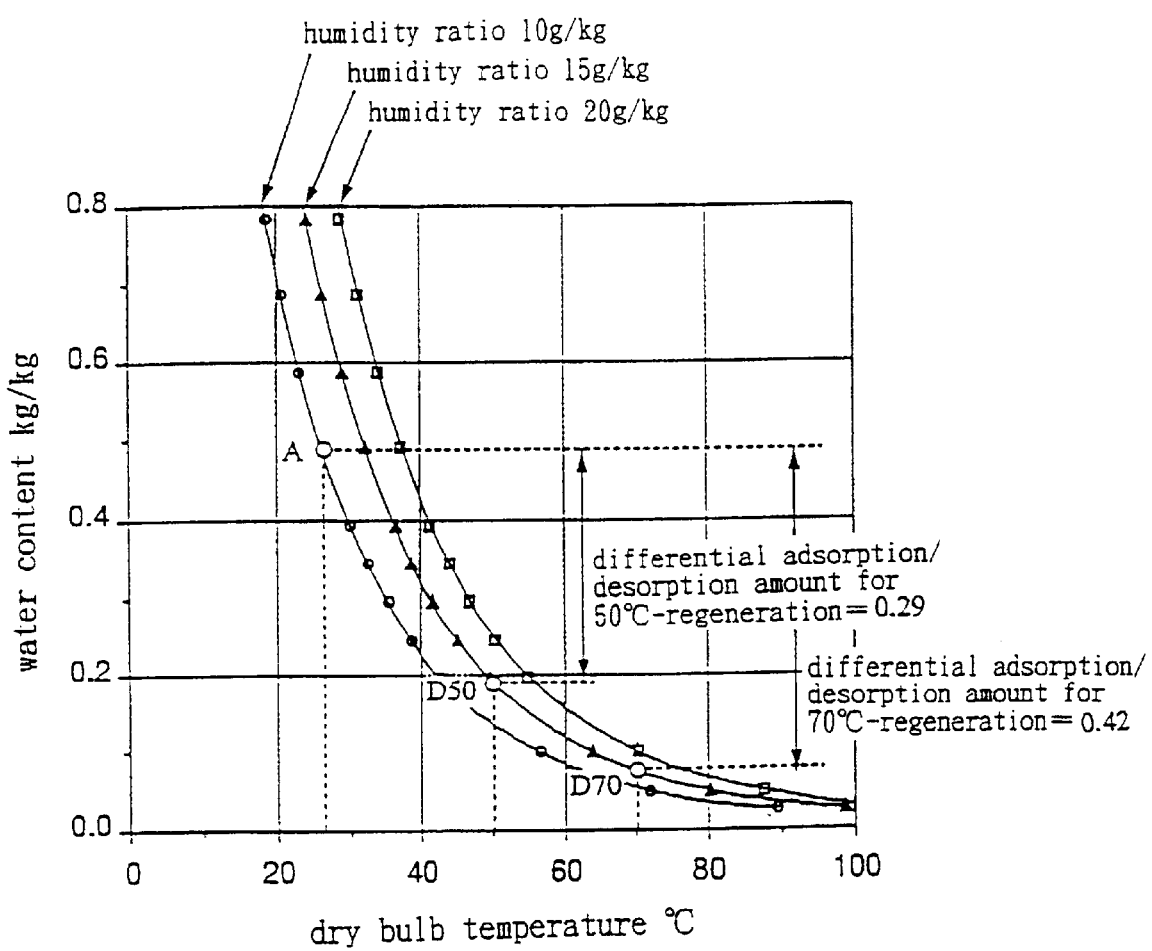
FIG. 2 is a graph of moisture adsorption and dry bulb temperature in contact with the desiccant with parametric absolute humidity (humidity ratio) of air.

FIG. 2 shows a relation of air temperature in contact with the desiccant material and the adsorption value at various values of humidity ratio of air as a parameter. Point A is the adsorption-start point for the desiccant material, which is in equilibrium with the indoor air. Points D50 and D70 refer to desorption-start points for the dry desiccant materials regenerated at 50 and 70° C., respectively, which are in equilibrium with the regeneration air. From FIG. 2, it can be seen that the differential adsorption capacity of the material is 0.29 kg of moisture per kg of desiccant material for 50° C.-regeneration and 0.42 kg/kg for 70° C.-regeneration. The value for 50° C.-regeneration is 1.7 times the value obtained by zeolite regenerated at conventional regeneration temperature of 100° C., and is 2.1 times the value for silica-gel. This means that about 60% by weight of the present material regenerated at lower temperature produce the same degree of dehumidification as zeolite regenerated at 100° C.

Figure 12:
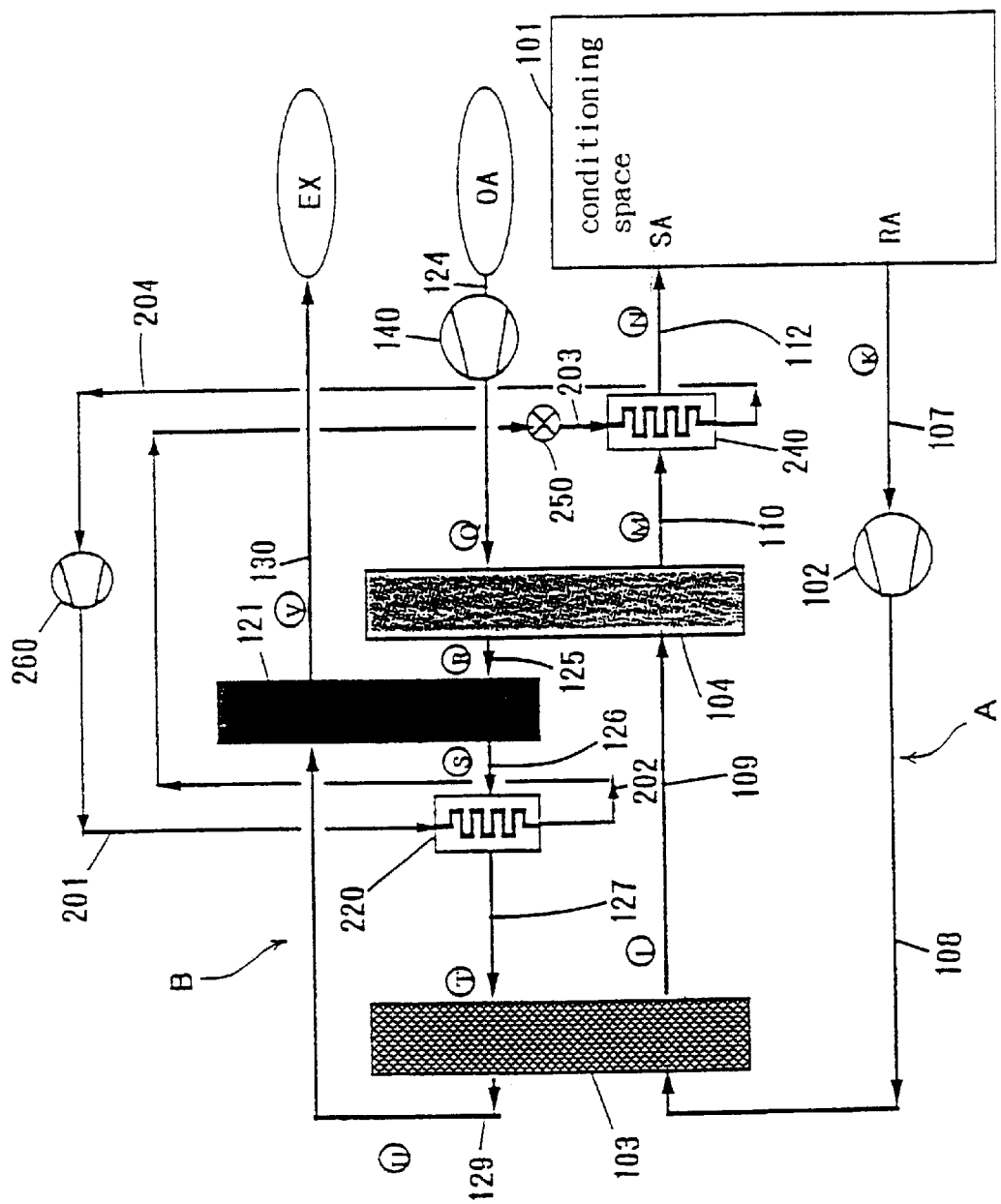
FIG. 12 is a schematic diagram of another conventional air conditioning system.
Figure 13:
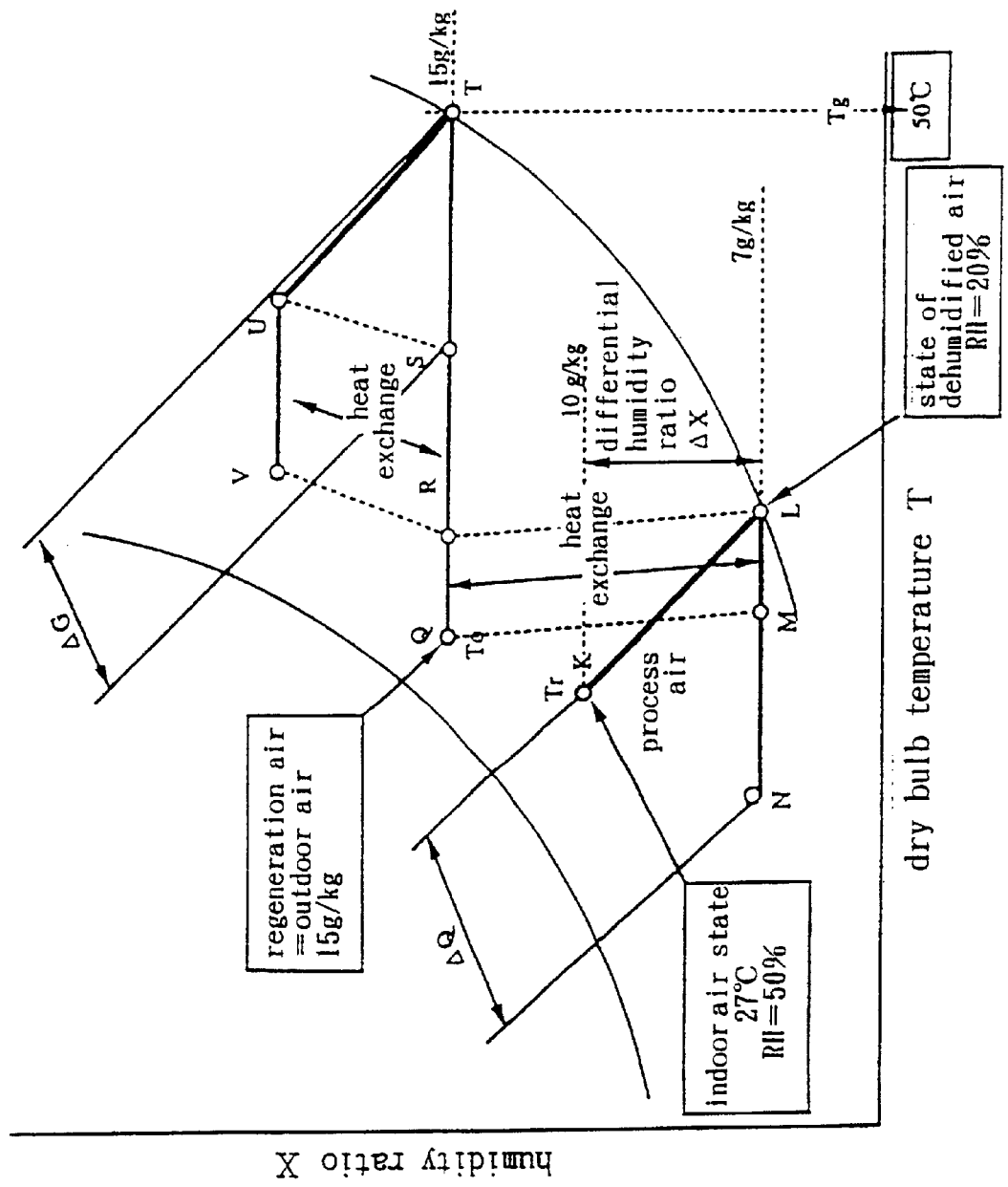
FIG. 13 is a psychrometric chart showing the operational states in the system shown in FIG. 12.
Figure 14:
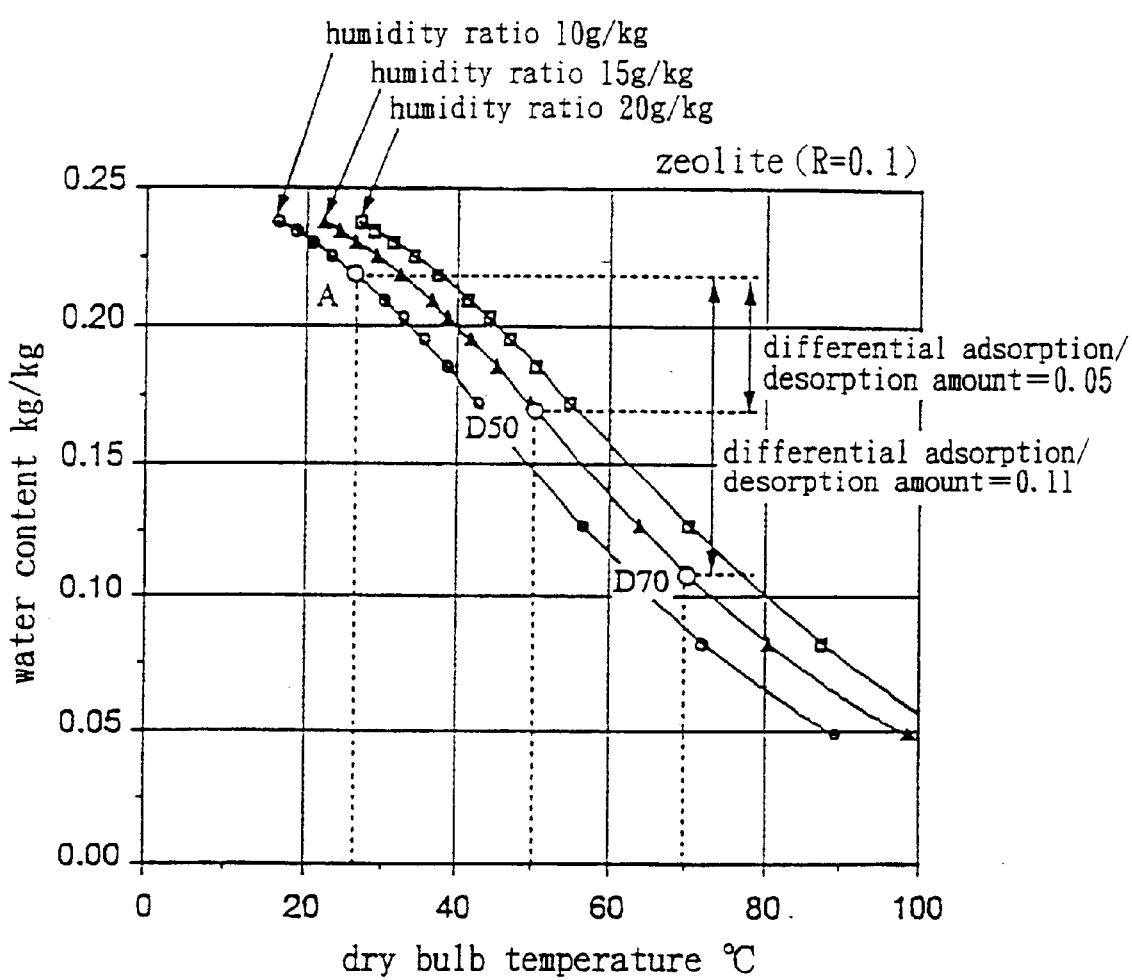
FIG. 14 is a graph showing the relation between air contacting the desiccant and adsorption capacity of zeolite desiccant according to adsorption isotherm shown in FIG. 11.

Next, the operation of the present desiccant assisted air conditioning system shown in FIG. 12 will be explained using the psychrometric chart shown in FIG. 13.

Process air (state K) flows through the desiccant wheel 103 which adsorbs moisture from the process air (state L), and in flowing through the first sensible heat exchanger 104, transfers heat to the regeneration air (state Q) and is cooled (state M), and is further cooled (state N) in the low-temperature heat source 240 of the heat pump, and returns to the conditioning space 101 as supply air SA. In the meantime, regeneration air is admitted from outdoors (state Q) into the first sensible heat exchanger 104 to receive heat from the process air (state L) thereby raising its temperature (state R), and enters into the second sensible heat exchanger 121 to receive heat from the post-desiccant regeneration air (state U) thereby raising its temperature (state S), and is further heated in the high-temperature heat source 220 of the heat pump to raise its temperature (state T), and is then flows through the desiccant wheel 103 to desorb the moisture thereby regenerating the desiccant. Post-desiccant regeneration air (state U) transfers heat (state V) in the second sensible heat exchanger 121 to the regeneration air exiting from the first sensible heat exchanger 104, and is discarded as exhaust. Accordingly, the desiccant assisted air conditioning system operates by generating a differential humidity ratio ΔX and a differential enthalpy ΔQ between the indoor air (state K) and the supply air (state N) to provide a dehumidification and cooling effect of the conditioning space. The driving energy for the system is afforded by the differential heat obtained by subtracting the afore-mentioned heat ΔQ from the heat input ΔG to heat the regeneration air so that desiccant regeneration is carried out utilizing the waste heat generated in a sensible heat treatment process from state M to state N, thereby providing an excellent energy efficiency for the system.

In this system, because the supply air temperature (state N) can be made lower than the indoor air temperature (state K), there is no need to cool the air using the humidifier 105. On the other hand, in the conventional air conditioning systems, because it removes sensible heat from the process air, liquid water is added to the process air after it is dehumidified to cool the process air, therefore, it is necessary to remove more moisture than is truly required based on the difference in the humidity values of supply air and room air. As can be seen in FIG. 12, humidifier is not used in the present system, and the net moisture to be removed by the desiccant is low, and therefore, the same degree of dehumidifying and cooling can be achieved by using a smaller amount of desiccant member relative to the amount required by the conventional systems.

Accordingly, in the present system, high capacity desorption can be obtained even at low regeneration temperatures, and a small amount of desiccant is sufficient to remove a large amount of moisture, thereby enabling to use a smaller desiccant wheel. Also, desorption temperature for regeneration air (state T) can be selected in the range of 50~55° C., and therefore, the operating temperature (condensing temperature) of the high-temperature heat source 220 of the heat pump can be lowered, and the power required to operate the heat pump can also be lowered. Present system is overall much more energy conserving, and is more compact compared with the conventional systems.

Figure 3:
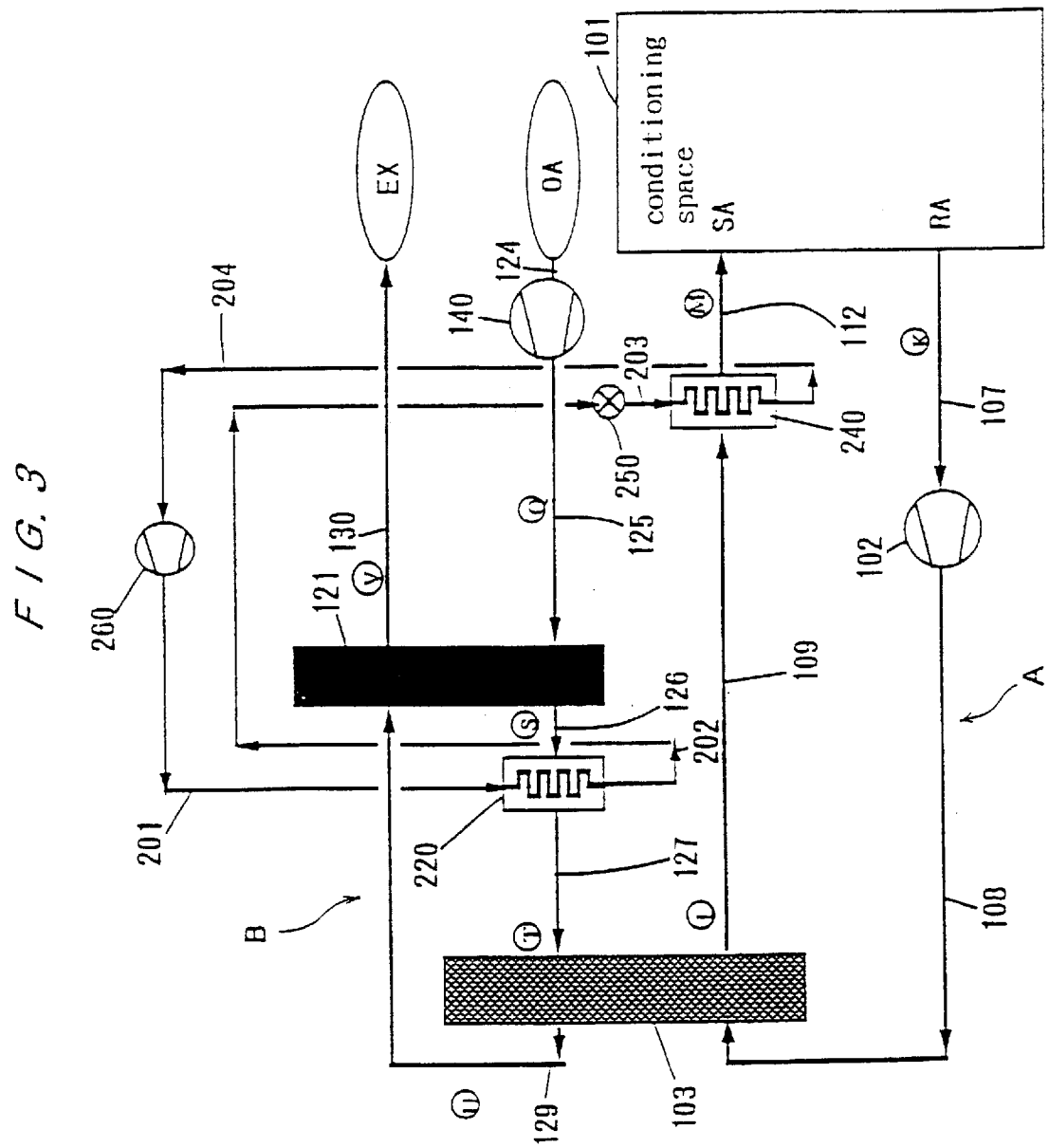
FIG. 3 is a schematic diagram of a second embodiment of the air-conditioning system of the present invention.
Figure 4:
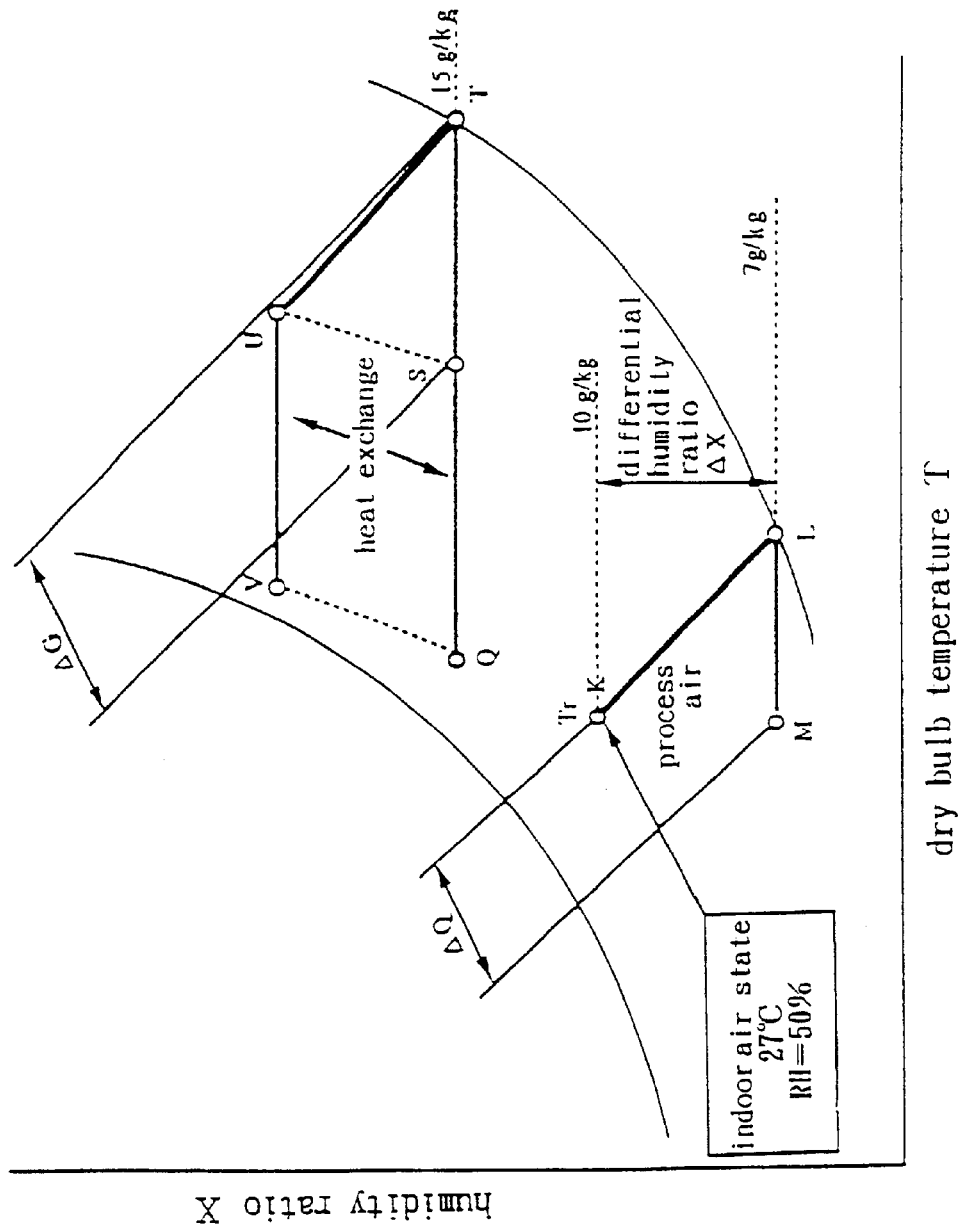
FIG. 4 is a psychrometric chart showing the operational states in the system shown in FIG. 3.

FIG. 3 shows the system configuration in a second embodiment. The air conditioning system shown in FIG. 3 is a hybrid system combining a desiccant and a heat pump as in FIG. 12, but without the first sensible heat exchanger 104, and the desiccant wheel 103 uses the high absorption polymeric material as in the first embodiment. In this system, process air and regeneration air do not exchange heat so that the process air is supplied at higher temperatures. Therefore, this type of system is most suitable when the use is primarily dehumidification involving low sensible heat ratios. The operation of this system will be explained with reference to the psychrometric chart shown in FIG. 4 related to the system shown in FIG. 3.

Process air (state K) flows through the desiccant wheel 103 which adsorbs moisture (state L), and is cooled (state M) in the low-temperature heat source 240 of the heat pump and returns to the conditioning space 101. In the meantime, regeneration air, which is outdoor air (state Q), enters into the sensible heat exchanger 121 to receive heat from the post-desiccant regeneration air (state U) thereby raising its temperature (state S), and is further heated in the high-temperature heat source 220 of the heat pump to raise its temperature (state T), and then flows through the desiccant wheel 103 to desorb the moisture. Post-desiccant regeneration air (state U) transfers heat (state V) to the regeneration air in the sensible heat exchanger 121, thereby returning heat to the system and is discarded as exhaust. Accordingly, the desiccant assisted air conditioning system performs its functions by generating a differential humidity ratio $\Delta X$ and a differential enthalpy $\Delta Q$ between the indoor air (state K) and the supply air (state M). Compared with the first embodiment, the temperature of supply air is higher and is close to room air temperature, and therefore, it is most suitable when the conditioning load is primarily humidity lowering (latent heat load). If the supply air temperature is adjusted to 27° C. which is about the same as room air temperature, the temperature difference between regeneration air at 50° C. and supply air is only 23° C., so that the temperature lift, i.e., temperature difference between the low- and high-temperature heat sources of the heat pump will be 33° C. by adding 10° C. to 23° C. Compared with the conventional vapor compression type air conditioning systems, the heat pump can be operated at a much lower temperature lift, thereby enabling to conserve energy. Because a dew drainage is not needed, the facility becomes simpler, and as in the first embodiment system, small amount of desiccant member is needed to treat a large amount of moisture so that the desiccant wheel can be made compact. Therefore, the overall system exhibits superior energy efficiency and a compact arrangement is effective for equivalent performance.

Figure 5:
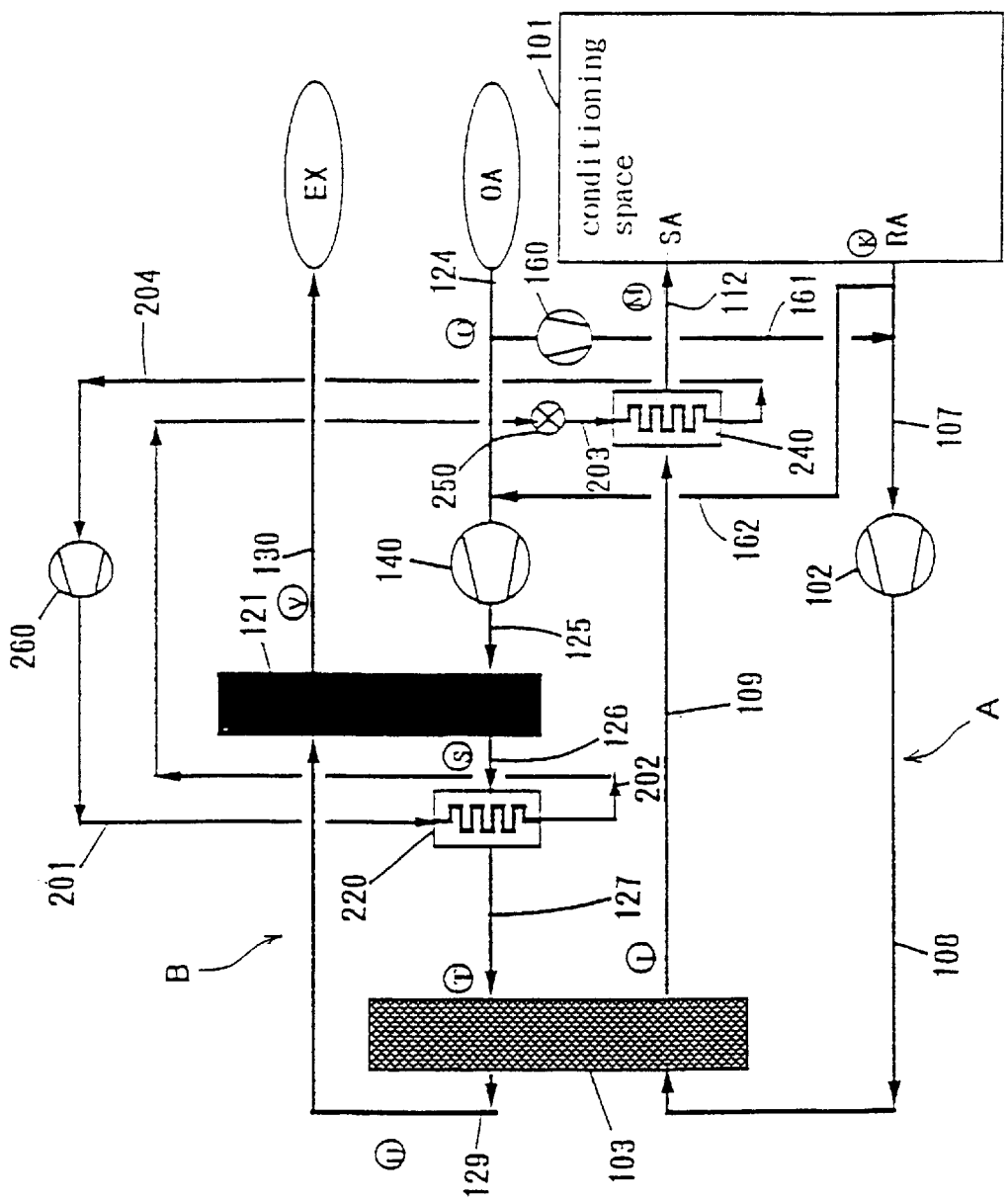
FIG. 5 is a schematic diagram of a third embodiment of the air-conditioning system of the present invention.

FIG. 5 shows the system configuration in a third embodiment. The air conditioning system shown in FIG. 5 is also a hybrid system similar to the one shown in FIG. 3, but the difference is that the process air is a mixture of outdoor air and indoor return air while the regeneration air is a mixture of indoor exhaust air and outdoor air. For this reason, in addition to the system configuration shown in FIG. 3, a passage 161 and a blower 160 are provided between a process air passage 107 and an outdoor air admittance passage 124 for mixing outdoor air with return room air, and a passage 162 is provided between a regeneration air passage 124 and a return air passage 107 for mixing the return room air with outdoor air. In such a system, because the humidity ratio of the process air at the adsorption-start point of the desiccant is higher than that specified in the Japanese Industrial Standards (JIS) for indoor comfort, regeneration air must be heated to a higher temperature in order to maintain the humidity at 7 g/kg as in the previous embodiment; however, the same benefits as before are accrued using the desiccant member of the present invention. In the following, the operation of the system based on the high absorption polymeric material will be explained with reference to the psychrometric chart shown in FIG. 6, and the relation of air temperature and moisture adsorption at varying humidity ratio levels shown in FIG. 7.

Mixed process air (state F) comprised by outdoor air (state Q) and indoor return air (state K) flows through the desiccant wheel 103 which adsorbs moisture (state L), and is further cooled (state M) in the low-temperature heat source 240 of the heat pump and returns to the conditioning space 101. In the meantime, regeneration air is also a mixture (state G) comprised by outdoor air (state Q) and return indoor air (state K) enters into the sensible heat exchanger 121 to receive heat from the post-desiccant regeneration air (state U), thereby raising its temperature (state S), and is further heated in the high-temperature heat source 220 of the heat pump to raise the temperature (state T), and flows through the desiccant wheel 103 to desorb the moisture. Post-desiccant regeneration air (state U) transfers heat to the regeneration air (state V) in the sensible heat exchanger 121, thereby returning heat to the system and is discarded as exhaust. Accordingly, the desiccant assisted air conditioning system performs its functions by generating a differential humidity ratio $\Delta X$ and a differential enthalpy $\Delta Q$ between the indoor air (state K) and the supply air (state M).

Figure 6:
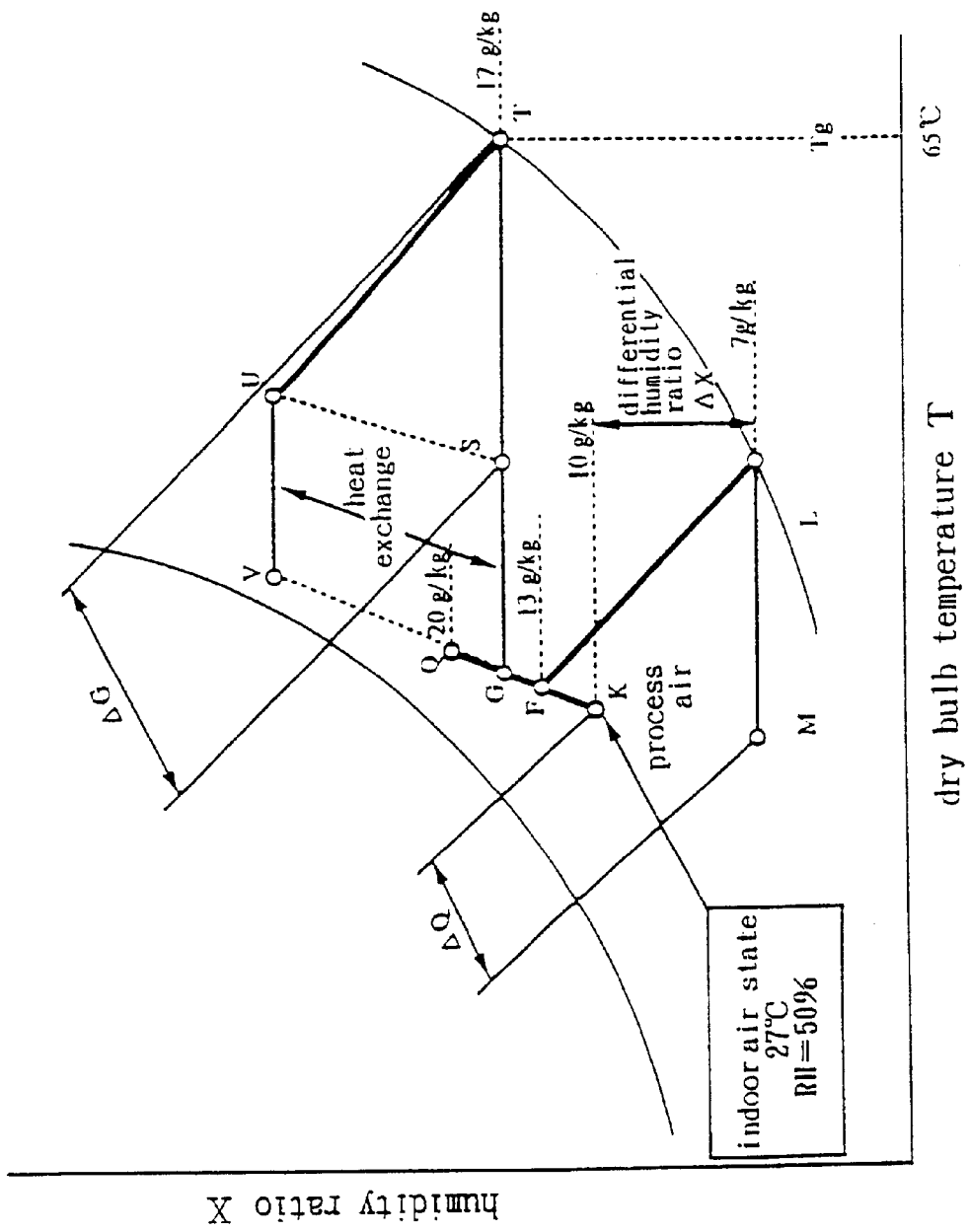
FIG. 6 is a psychrometric chart showing the operational states in the system shown in FIG. 5.
Figure 7:
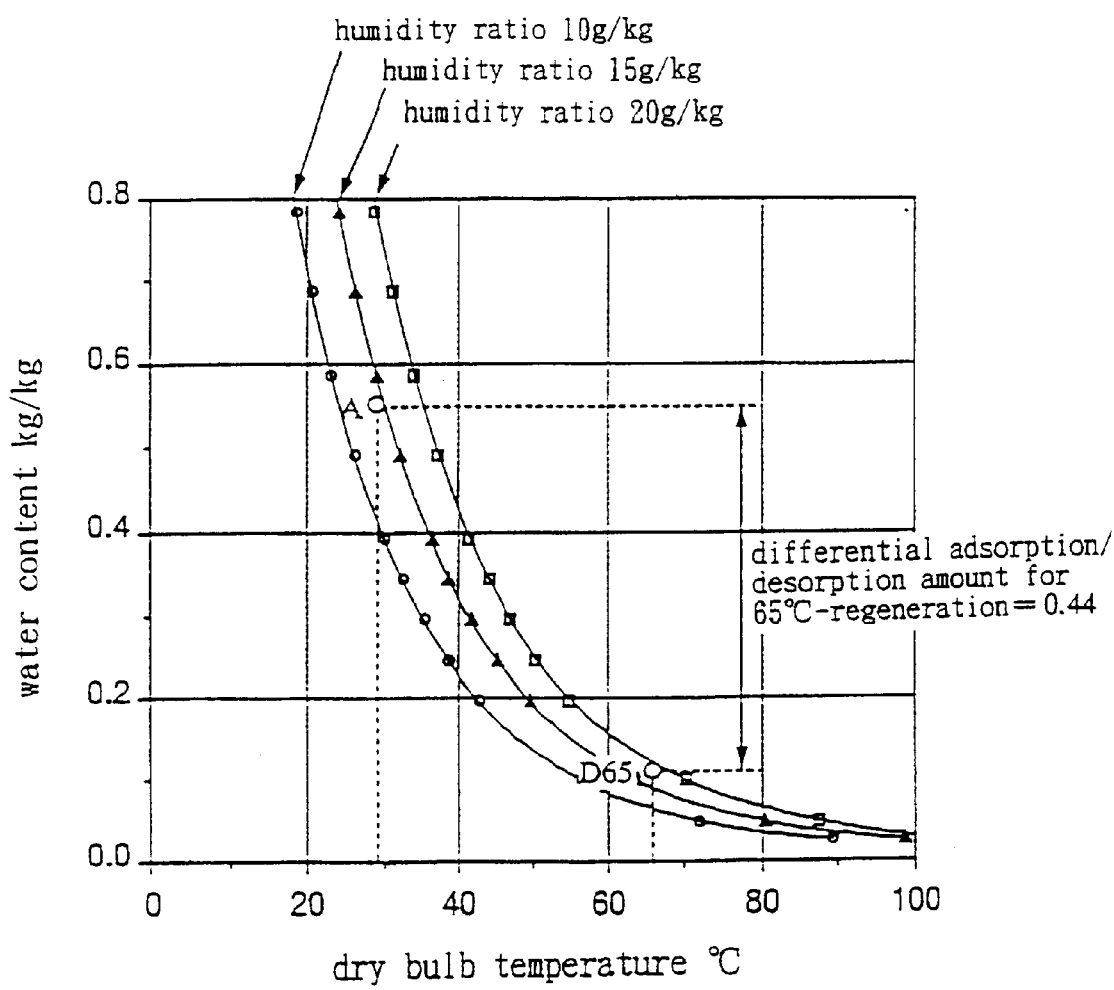
FIG. 7 is a graph showing an adsorption isotherm of the high absorption polymeric material.

Compared with the second embodiment system, this system based on mixing indoor air with outdoor air is most suitable for maintaining a certain level of comfort in the indoor environment. Assuming that, on a typical midsummer day, indoor air is at 27° C. with a 50% relative humidity (RH) and outdoor is at 33° C. with a 63% RH, then, pre-desiccant process air is mixed with outdoor air having a humidity ratio of 20 g/kg to become process air at a dry-bulb temperature of 29° C. and a humidity ratio of 13 g/kg as shown in FIG. 6. After being dehumidified by adsorption in the desiccant member, process air moves along the isenthalpic line to a humidity ratio of 7 g/kg at state L having a relative humidity of about 10% (more accurately 11%). Therefore, the temperature of regeneration air for desorption-start is 65° C., as described before, according to the intersection point of the relative humidity line at 10% and the humidity ratio line at 17 g/kg. On the other hand, pre-desiccant regeneration air is at dry bulb temperature of 31° C. and a humidity ratio of 17 g/kg because of mixing with return air having a humidity ratio of 10 g/kg. Therefore, the desiccant condition at the desorption-start point (state T) is at a dry-bulb temperature of 65° C. and a humidity ratio of 17 g/kg. The differential adsorption capacity of the desiccant member, given by the difference between the adsorption-start state F (dry-bulb temperature at 29° C. and humidity ratio of 13 g/kg) and the regeneration-start state T (dry-bulb temperature at 31° C. and humidity ratio at 17 g/kg) is 0.44 g/kg as indicated in FIG. 7 for this material. The moisture adsorption capacity is as large as what was shown in FIG. 2. The operation of the various devices for process air and regeneration air is the same as in the second embodiment, and will not be repeated.

As demonstrated in this embodiment, even when it is necessary to raise the regeneration temperature slightly about 65° C. because of mixing with outdoor air, differential adsorption capacity of the material remains high so that a small amount of material is needed to perform an equal degree of dehumidification, thereby enabling to provide a compact desiccant wheel. Also, the temperature of regeneration air can be set low (state T), so that the operating temperature (condensation) of the high temperature heat source 220 of the heat pump is lowered, thereby lowering the drive power for the compressor of the heat pump. The overall system is thus energy efficient and compact.

Figure 8:
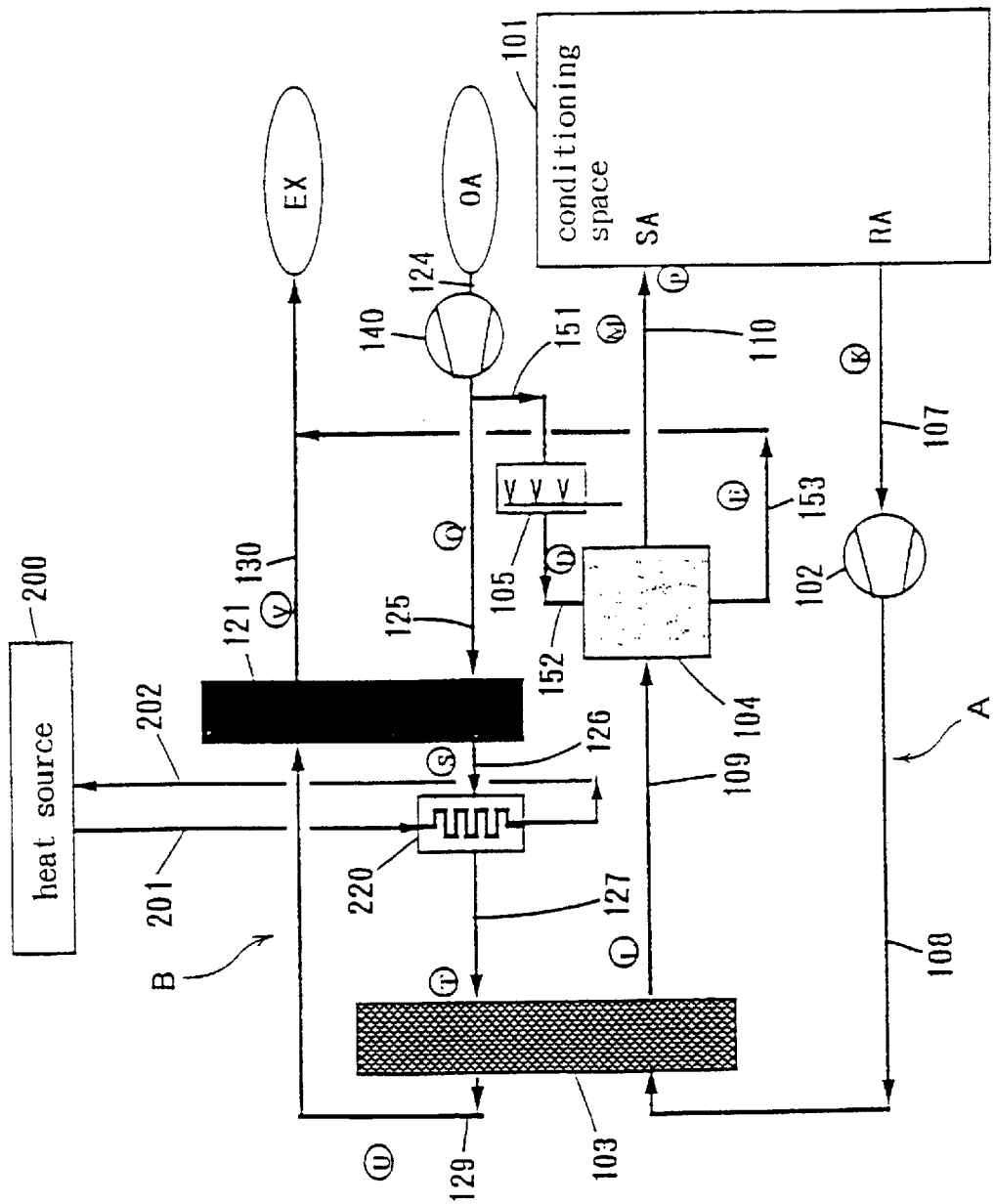
FIG. 8 is a schematic diagram of a fourth embodiment of the air-conditioning system of the present invention.
Figure 9:
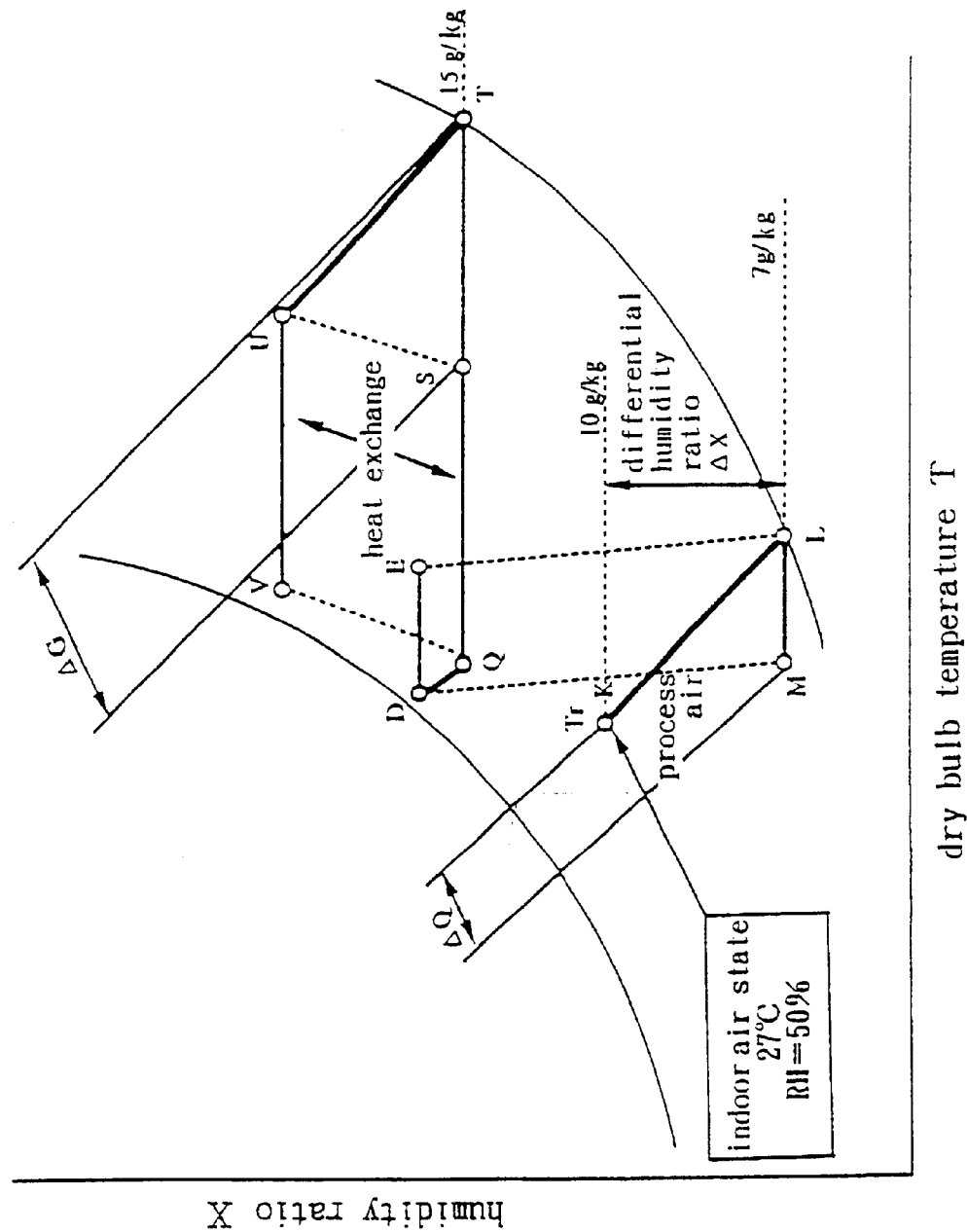
FIG. 9 is a psychrometric chart showing the operational states in the system shown in FIG. 8.
Figure 10:
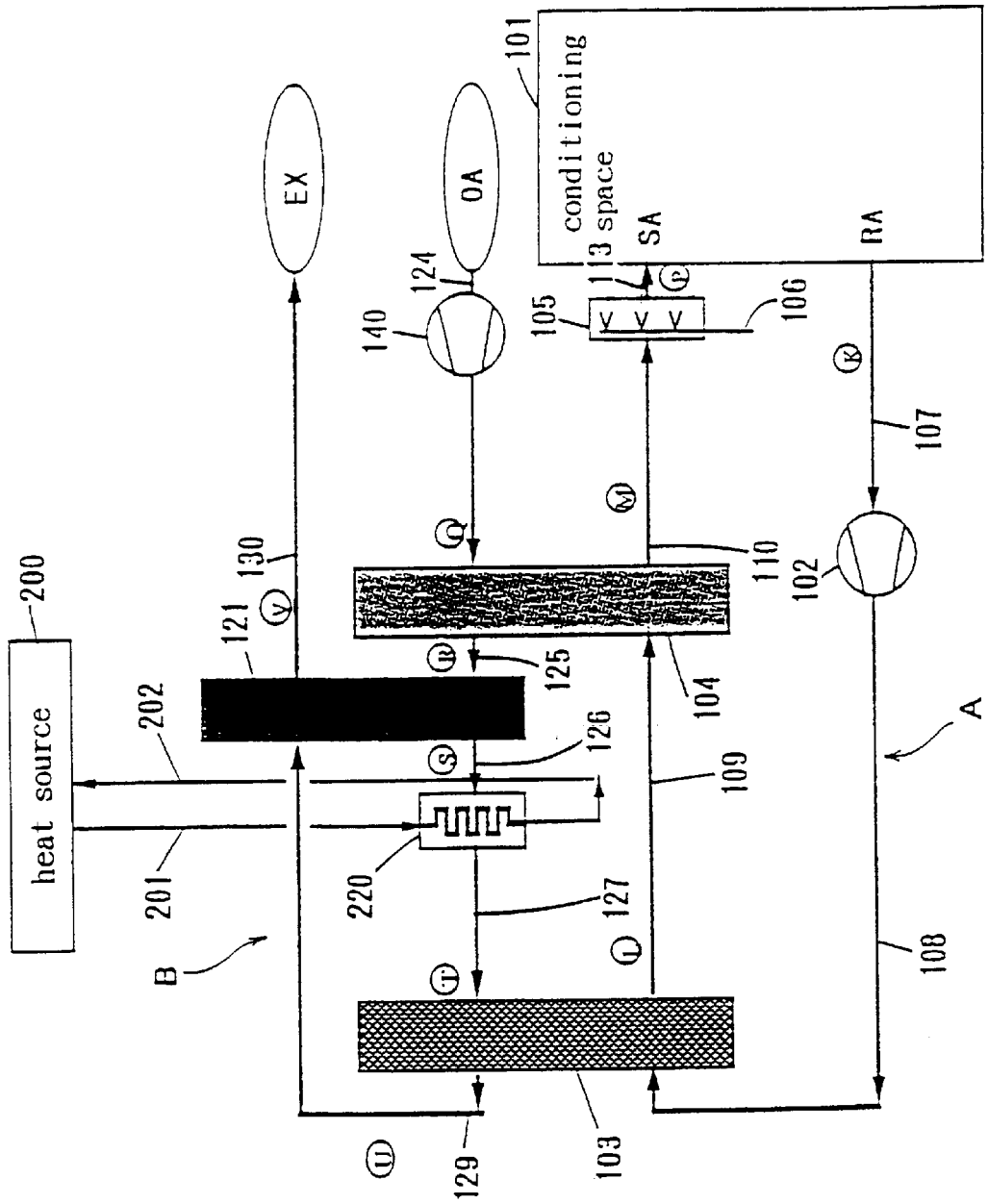
FIG. 10 is a schematic diagram of a conventional air conditioning system.
Figure 11:
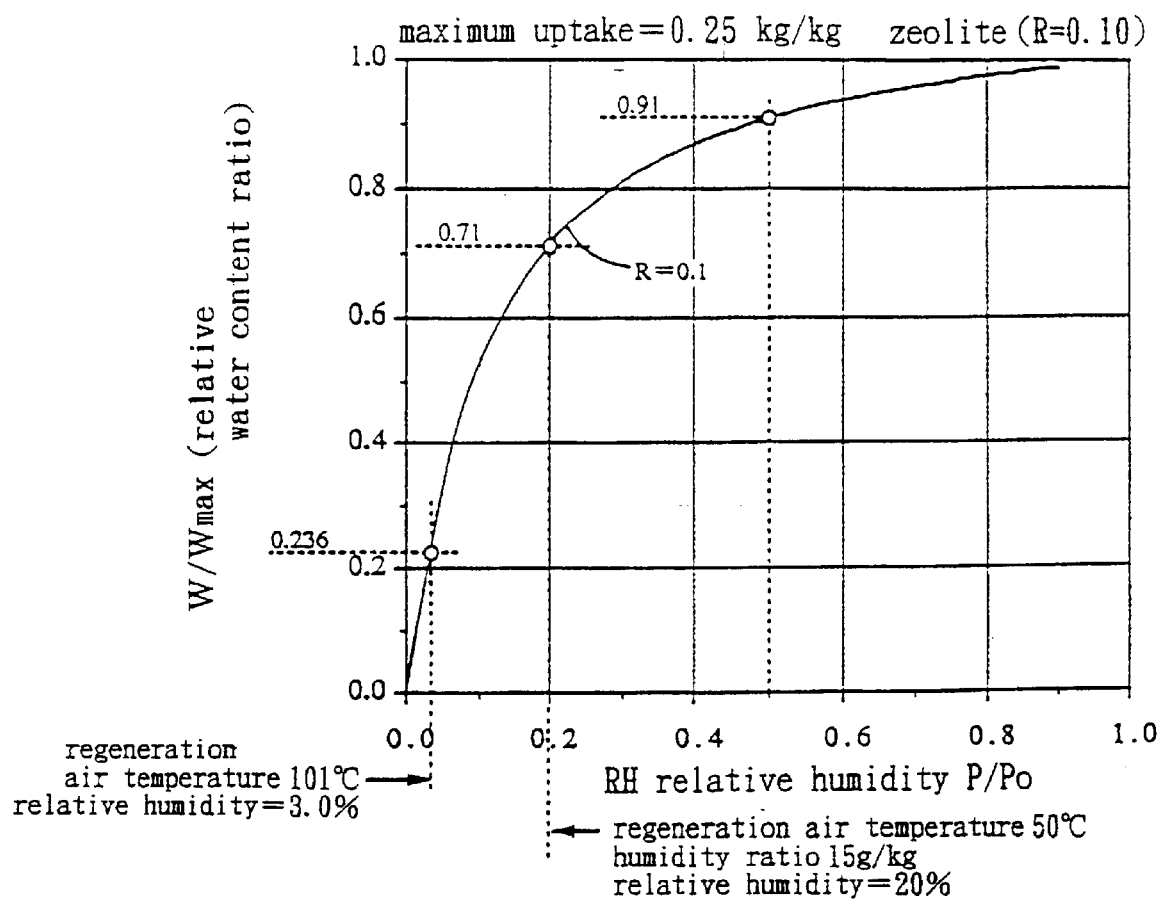
FIG. 11 is a graph of adsorption isotherm for zeolite.

FIG. 8 shows the system configuration in a fourth embodiment of the invention. This system is similar to the so-called desiccant-assisted air conditioning system without the heat pump shown in FIG. 10. The difference is that dehumidified process air is cooled in the heat exchanger 104 by means of heat exchange with the outdoor air which is humidified in a humidifier 105, thereby eliminating heat exchange between process air and regeneration air. In the conventional systems, regeneration air is first humidified to lower its dry-bulb temperature and is then subjected to heat exchange with process air, but in such a process, humidity ratio of the regeneration air becomes elevated, and in order to attain the same level of relative humidity in the regeneration air as in the dehumidified process air, it is necessary to heat the regeneration air to a high temperature. But the present system avoid this difficulty by providing a separate cooling path for cooling the process air. The operation of the system shown in FIG. 8 will be explained using a psychrometric chart given in FIG. 9.

Process air (state K) flows through the desiccant wheel 103 and is removed of its moisture (state L), and is further cooled (state M) in the cooler 104 by the humidified outdoor air and returns to the conditioning space 101. In the meantime, regeneration air is admitted from outdoors (state Q) and enters into the sensible heat exchanger 121 to receive heat from the post-desiccant regeneration air (state U) thereby raising its temperature (state S), and is further heated in the heater 220 (state T), and then flows through the desiccant wheel 103 to desorb the moisture. Post-desiccant regeneration air (state U) transfers heat, in the sensible heat exchanger 121, to the incoming regeneration air (state Q), and the cooled regeneration gas (state V) is discarded as exhaust. In a separate thermal circuit, cooling air which is outdoor air (state Q) is admitted into the humidifier 105, so that its temperature is lowered (state D) by the heat of evaporation of water, and then it is mixed in the heat exchanger 104 to remove heat from the process air (state L) to produce supply air (state M), and the warmed cooling air (state E) is discarded as exhaust.

Accordingly, a humidity ratio difference DX is generated between room air (state K) and supply air (state M) to provide a dehumidifying effect. Compared with conventional systems, because the supply air temperature is lower and is closer to the room air temperature, sensible heat load of the room air is not increased, so that the system is suitable when a conditioning load requires primarily dehumidification (latent heat load). Outdoor summer temperature is generally around 28° C., which is not much different than indoor air temperature, so that room dehumidification can be achieved without increasing the sensible heat load by using the present system in which no humidifier is provided in the process air passage. Therefore, latent heat load can be processed by using low temperature heat source at 50~70° C. such as waste heat or solar heating instead of using vapor compression cycle type cooling system. As in the first embodiment system, a small amount of desiccant member is sufficient to process a large amount of moisture, thereby providing a compact desiccant wheel. Therefore, compared with the conventional system, the present system offers superior energy efficiency with a compact air conditioning system.

INDUSTRIAL APPLICABILITY

The present invention is advantageous as an air conditioning system used in general dwelling houses or larger buildings used as a supermarket or business offices.

What is claimed is:

1. A desiccant assisted air conditioning system comprising: a process air path for flowing process air to adsorb moisture from said process air by a desiccant member; and a regeneration air path for flowing regeneration air heated by a heat source to desorb moisture from said desiccant member, said desiccant member being arranged so that said process air or said regeneration air flows alternatingly through said desiccant member; wherein said desiccant member comprises a desiccant material which is an organic polymer material, said organic polymer material comprising an amphoteric ion exchange polymer having an anion exchange group, a cation exchange group and bridging ligands, thereby exhibiting a high differential adsorption capacity.

2. A system according to claim 1, wherein said organic polymer material is obtained by reacting an acrylonitrile homopolymer or copolymer with a hydrazine or hydrazine homologue to provide an anion exchange group followed by hydrolyzing residual nitrile group to provide a cation exchange group.

3. A system according to claim 1, wherein said organic polymer material includes said anion exchange group at a concentration of 0.01~5.0 meq/g and said cation exchange group at a concentration of 2~11 meq/g.

4. A system according to claim 1, wherein said desiccant material is regenerated at a temperature of not more than 70° C.

5. A system according to claim 4, wherein a heat pump is provided, and dehumidified process air is cooled by a low-temperature heat source of said heat pump, and pre-desiccant regeneration air is heated with a high-temperature source of said heat pump.

6. A method for operating a desiccant assisted air conditioning method comprising: flowing a process air through a process air path to adsorb moisture from said process air by a desiccant member; and flowing a regeneration air through a regeneration air path for heating said regeneration air by a heat source and for desorbing moisture from said desiccant member, said desiccant member being arranged so that said process air or said regeneration air flows alternatingly through said desiccant member; wherein said desiccant member comprises a desiccant material which is an organic polymer material, said organic polymer material comprising an amphoteric ion exchange polymer having an anion exchange group, a cation exchange group and bridging ligands, thereby exhibiting a high differential adsorption capacity.

7. A method according to claim 6, wherein said organic polymer material is obtained by reacting an acrylonitrile homopolymer or copolymer with a hydrazine or hydrazine homologue to provide an anion exchange group followed by hydrolyzing residual nitrile group to provide a cation exchange group.

8. A method according to claim 6, wherein said organic polymer material includes said anion exchange group at a concentration of 0.01~5.0 meq/g and said cation exchange group at a concentration of 2~11 meq/g.

9. A method according to claim 6, wherein said desiccant material is regenerated at a temperature of not more than 70° C.

10. A method according to claim 9, wherein a heat pump is provided, and dehumidified process air is cooled by a low-temperature heat source of said heat pump, and pre-desiccant regeneration air is heated with a high-temperature source of said heat pump.

* * * * *

UNITED STATES PATENT AND TRADEMARK OFFICE
CERTIFICATE OF CORRECTION

PATENT NO.    : 6,334,316 B1
DATED         : January 1, 2002
INVENTOR(S)   : Meada et al.

It is certified that error appears in the above-identified patent and that said Letters Patent is hereby corrected as shown below:

Title page,
Item [73], Assignee, "Ebara Corporation, Tokyo (JP)" should be -- Ebara Corporation, Tokyo (JP) Japan Exlan Co., Ltd., Osaka, (JP) --

Signed and Sealed this

Twentieth Day of August, 2002

Attest:

Attesting Officer

JAMES E. ROGAN
*Director of the United States Patent and Trademark Office*